United States Patent [19]

Nakamura

[11] 4,318,574

[45] Mar. 9, 1982

[54] CYLINDRICAL ROLLER BEARING

[75] Inventor: Rinzo Nakamura, Hiratsuka, Japan

[73] Assignee: Nippon Seiko Kabushiki Kaisha, Tokyo, Japan

[21] Appl. No.: 168,091

[22] Filed: Jul. 14, 1980

[30] Foreign Application Priority Data

Jul. 18, 1979 [JP] Japan .......................... 54/99266[U]

[51] Int. Cl.³ ........................................... F16C 33/58
[52] U.S. Cl. .................................... 308/216; 308/202
[58] Field of Search ............... 308/216, 202, 214, 215, 308/213, 212

[56] References Cited

U.S. PATENT DOCUMENTS 3,963,285  6/1976  Kellstrom .......................... 308/216
4,027,930  6/1977  Bodensieck ........................ 308/202
4,270,815  6/1981  Olschewski et al. ............... 308/216

Primary Examiner—Lenard A. Footland
Attorney, Agent, or Firm—Basile, Weintraub & Hanlon

[57] ABSTRACT

A cylindrical roller bearing for high speed rotation comprises an annular flange arranged on either or both an outer race and inner race, wherein each guide face of the flange receives an end face of an adjacent or associated roller. Each flange comprises an annular convex guide face including two tapered surfaces, arranged at opposing sides of the guide flange of the outer race, or the inner race, where the guide faces slidably contact, relative to the adjacent cylindrical roller.

4 Claims, 8 Drawing Figures

CYLINDRICAL ROLLER BEARING

BACKGROUND OF THE INVENTION

I. Field of the Invention

This invention relates to a cylindrical roller bearing, and more particularly, to a cylindrical roller bearing which is subjected to high speed rotation, and which comprises at least one guide flange arranged in either one or both an outer race and an inner race (ring), the guide face of which slidably receives a pair of adjacent end faces of the cylindrical roller.

II. Description of the Prior Art

Within the art of high speed roller bearings, it is widely known that so-called "skewing" is liable to occur when a cylindrical roller bearing rotates under a radial load.

This phenomenon of skewing will be explained hereinafter by referring to a conventional cylindrical roller bearing.

"Skewing angle" in the following explanation refers to an inclination angle of the axis of the cylindrical roller, relative to the rotating axis of the bearing, when any of the cylindrical rollers rotationally moves around between an inner race and an outer race provided with a pair of annular guide flanges.

A pair of end faces of the cylindrical rollers or roller bearing and guide faces of the flange(s) are, originally, arranged as flat planes, wherein each is normal to the axis of the bearing assembly. Naturally, each end face of the skewed roller makes metal-to-metal contact with a guide face of the guide flange at a point on a circular, radial marginal end of the guide face.

A certain amount of force, due to relative sliding speed and skew moment, will be generated at the point of contact under the relative influence of (a) the rotational speed of the inner race, (b) the rotational speed of the cylindrical rollers, (c) the speed of circular movement of the cylindrical roller revolving around the axis of the bearing and (d) the skew moment of the cylindrical rollers. The generated force will break the film of lubricating oil between the end faces of the cylindrical rollers and the guide faces of the guide flange when the cylindrical rollers rotate at high speed. Thus, when this occurs there inevitably arises wear between the end face of the rollers and the guide faces of the flange due to metal-to-metal contact.

The kind of wear caused by such skewing, as mentioned above, frequently occurs, for example, in bearings, which receive shafts subjected to high speed rotation at as high as 3,000 r.p.m. This necessarily leads to serious problems, such as, a very short service life of the bearing in use.

In order that detrimental wear of the cylindrical roller bearing can be prevented, it becomes apparent, as can be understood from the causes which bring about the problem, that all three conditions itemized below must concurrently be fulfilled:

(1) lessen the relative sliding velocity at the point of contact, (2) reduce the amount of force at the point of contact generated by the skew moment, and (3) ensure that a sufficient lubricant film is maintained at the point of contact.

Each of these conditions will now be considered.

To fulfill condition (1), it is only necessary to shorten the length of the radius of the rotation of the cylindrical roller to less than that at the original contact point. This can be achieved by displacing the contact point away from the radially innermost end of said flange face at its initial position toward a part more adjacent to the raceway surface of the inner race.

The condition of item (2), can be solved by reducing the skewing angle by either:

(a) displacing the point of contact from its position adjacent to the raceway surface toward the radially innermost portion of the guide face of said flange, or (b) reducing the axial clearance between each end face of the roller and the adjacent guide face of the flange but in such a manner that the amount of axial movement of the roller between the two opposing guide faces and adjacent roller (hereinafter referred to as axial movement) is not excessively small.

The condition of item (3) can be solved by displacing the contact point away from the radially innermost marginal end to the portion more adjacent to the raceway surface, thereby effecting a sort of "wedge" effect.

It is already known, as disclosed in British Pat. No. 1,520,060, that crowning means applied on a guide surface of a flange is effective to prevent the end faces of cylindrical rollers incorporated therein from being in contact with the radially innermost end of the guide faces of the flange. However, this has several drawbacks. Crowning on the guide surface of a flange is very difficult to apply. Furthermore if it can be done, it is still practicably almost unattainable to have a radius of curvature of the guide face of each flange and the requisite amount of axial movement of rollers in each bearing assembly finished with the necessary degree of high accuracy in compliance with the predetermined design dimension. Due to the variations in working, the contact point of the end faces of each roller and the guide flange, even in an assembled roller, differs from one roller to another roller. This renders both the contact point control and the skew angle control very difficult. In this prior art roller bearing, since the amount of axial movement cannot be maintained constant, the nearer the contact point lies to the radially innermost end portion of the guide faces of the flange, the larger the relative sliding velocity becomes.

On the other hand, when the contact point is at a portion nearer to the raceway surface and when the axial movement of the rollers becomes greater, the skew angle of the roller will become greater, and this, naturally, increases the power caused by said skew moment.

Furthermore, where the contact point is at a point near the radially innermost end of guide face and the amount of the axial movement of the rollers is also large, then both the relative sliding velocity and the force generated by skew moment will become so great that they cannot always be compensated by the improved formation of lubricating oil film regardless of the effectiveness of the crowning.

Accordingly, there still remains such drawbacks that all of the aforesaid three conditions cannot concurrently be satisfied by the prior art roller bearings.

SUMMARY OF THE INVENTION

In view of the above, the present invention seeks accurately to control both the position of the contact point and the amount of the axial movement of the rollers. The present invention is achieved by directing the location of the contact point of the end faces of each of the rollers toward a direction radially outwardly from the innermost end of the guide face of the flange of the outer race. Alternatively, when this invention is applied to the inner race, the contact point is directed radially inward from the innermost end of the guide face of the flange of the inner race. The present invention, also, contemplates restraining the axial movement of the rollers within a practicably small amount.

Accordingly, an object of the present invention is to render the amount of force caused by the relative sliding velocity and skew moment as small as possible and to ensure improved oil film formation at the contact point.

Another object of the invention is to prolong the service life of the bearing by preventing detrimental wear at the opposite end faces of the cylindrical roller.

A further object of the present invention is to improve a cylindrical roller bearing ready to be machined and formed.

A still further object of the present invention is to provide a cylindrical roller bearing which especially can be applicable for use with a high speed rotating shaft.

According to one aspect of the present invention, there is provided a cylindrical roller bearing for high speed rotation which comprises an annular flange(s) arranged on either or both an outer race and inner race, wherein each guide face of the flange receives an end face of an adjacent or associated roller. Each flange comprises an annular convex guide face including two tapered surfaces, arranged at opposing sides of the guide flange of the outer race, or the inner race, where the guide faces slidably contact, relative to the adjacent cylindrical roller.

A cross-sectional configuration of the guide face, taken along the axis of rotation of the bearing, is defined as being double surfaced, by two contiguous straight lines radially and axially divergent, one after the other, from the axial end of the raceway of the outer race or inner race. Further, the amount of axial movement of the cylindrical roller is minimized to restrain the relative sliding velocity at the contact point of the roller with the guide flange. This minimizes the force exerted by a skew moment at the contact point.

As explained heretofore, the cylindrical roller bearing of the present invention keeps constant of the position of the contact point of the end faces of each roller with an adjacent guide face of the guide flange while minimizing the amount of axial movement of the roller between two opposite guide faces of the flange.

Consequently, the present invention contributes not only to improvement of the formation of a lubricating oil film by locating the contact point at an optimum position, but, also, to minimization of the skew angle of the skewed rollers when actually arisen during rotation.

Accordingly, the amount of wear at the end faces of the rollers can be greatly reduced and, thus, ensure extended service life of the bearing.

Also, no particular working or processing is required for making the present bearing structure, so that the manufacture of this bearing is quite easy and is suitable as a bearing usable for high speed rotation.

For a more complete understanding of the present invention reference is made to the following detailed description and accompanying drawing. In the drawing like reference characters refer to like parts throughout the several views, in which:

DETAILED DESCRIPTION OF THE PREFERRED EMBODIMENTS

Figure 1:
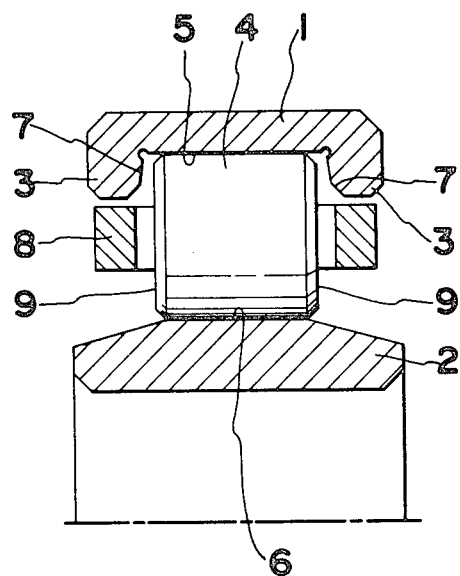
FIG. 1 is a partly sectioned side elevation showing a first embodiment of the cylindrical roller bearing of the present invention.

As shown in FIG. 1, a plurality of freely rotatable cylindrical rollers 4 (only one of which is shown) are arranged between an outer race 1 and an inner race 2. The rolling surface of each of the rollers or roller bearings 4 rotates while being kept in rotatable engagement with raceway surfaces 5 and 6 of the outer race 1 and the inner race 2, respectively.

A pair of guide flanges 3 extend radially and inwardly at the opposite axial ends of the outer race. A convex guide surface 7 is provided at each axial inner end of the guide flange 3. Each guide surface 7 engages and receives an associated end face 9 of an adjacent roller 4.

It should be noted that guide flanges of this kind may be arranged on the inner race 2, or can be provided on both the inner and outer races.

The guide flange 3 can be an integrally formed fixed type or can be a discrete ring type flange.

A cage 8 retains the rollers 4.

Figure 2:
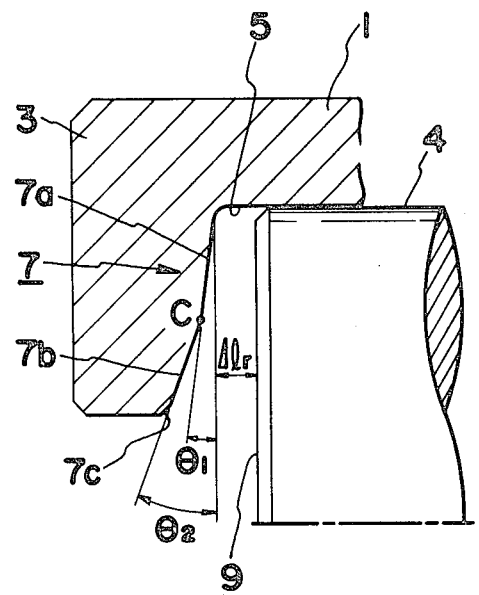
FIG. 2 is a partial, enlarged view of the first embodiment of this invention.

As shown in FIG. 2, the sectional configuration of the guide face 7 of the guide flange 3 comprises a combined convex circumferential face including two tapered annular rings, diverging in an axially outward direction, one after the other.

More specifically, the guide face 7 includes a first tapered annular face 7a, which extends from the axial end of the raceway surface 5, axially outwardly at a predetermined inclination angle $\theta$, with respect to the diametral plane of the bearing and a second tapered annular face 7b which intersects with the first annular face 7a at a circular line C and diverges further outwardly at a larger inclination angle $\theta_2$.

The inclination angles $\theta_1$ and $\theta_2$ can be suitably selected depending upon the loading condition to which the bearing is subjected.

In the embodiment mentioned above, the angle $\theta_1$ may, preferably, be selected within a range of 5'-60', while the $\theta_2$, may, preferably be with 10'-120'.

The location of the circular line C, formed by the intersection between the two faces 7a and 7b, is selected such that it is positioned apart from the inner most extremity, i.e., the crest of the flange, toward the radially outward direction and spaced by a suitable distance, preferably, more than one-third of the radial length (height) of the guide face 7 of the guide flange 3.

Alternatively, where the guide face 7 is arranged on an inner race, the location of the intersectional circular line C is selected at a radially inner portion of the flange apart from the radially outermost extremity, i.e., the crest of the flange.

The end face 9 of the cylindrical roller 4 is kept normal to the axis of the bearing.

Figure 3:
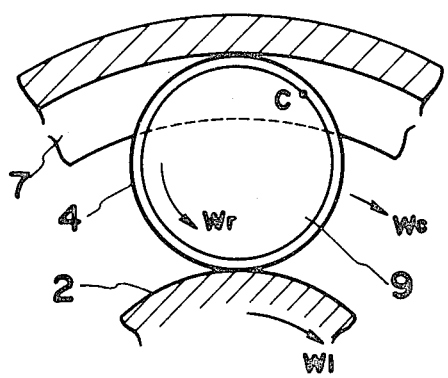
FIG. 3 is an end view of the embodiment of the present invention.

It is to be seen that even if any skewing of a roller occurs during its rotation, the end face 9 of the cylindrical roller will always engage a portion of the intersectional circular line C. Thus the contact point of the roller 4 with the guide face 7 will come to a point c, as shown in FIG. 3, which is closer to the raceway surface. This makes the radius of the rotation of the roller shorter, thereby reducing the relative sliding velocity of the two members. Also, a wedge-action occurs at the contact point due to double tapered face which functions to prevent any interruption of lubricating oil film from occuring.

It is, also, necessary to properly select the axial distance between the two opposite guide faces 7 of the flange 3 of the outer race such that it is able to restrain the bearing rollers from its axial movement, $\Delta lr$, as much as possible. Accordingly, the roller bearing of this invention is able to substantially restrain the roller against any increase in its skew angle, and minimize it, even if it occurs, so it will not induce any further detrimental force, due to any occurring skew moment.

Figure 4:
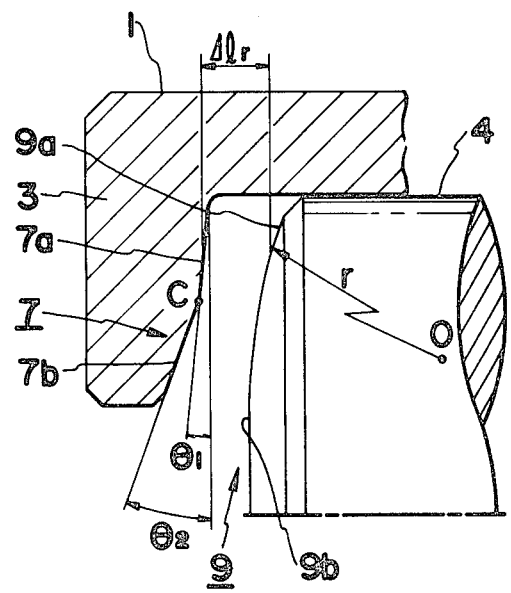
FIG. 4 is an enlarged partial, side elevation showing a second embodiment of this invention.
Figure 5:
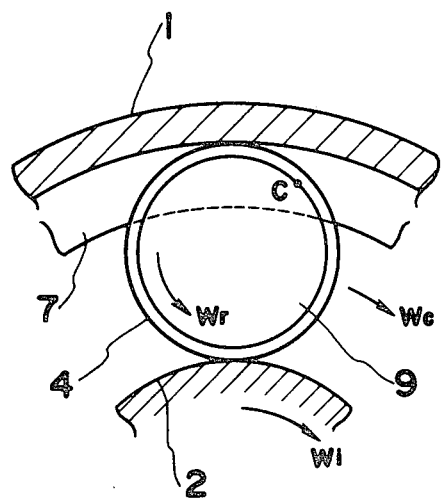
FIG. 5 is an end view of the second embodiment of the present invention.

FIG. 4 shows another embodiment of the present invention, wherein the cross sectional configuration of the guide face 7 of guide flange 3 is the same as that given with respect to the embodiment of FIG. 2. In this embodiment, the end faces 9 of a cylindrical roller 4 have a combined convex surface comprising (a) a part of a convex spherical outer surface 9a having a radius of curvature r at and near the radially outer marginal circumference from its rolling surface and (b) a flat central surface 9b normal to the axis of the roller and smoothly contiguious to the convex spherical outer surface 9a. The center of the radius of curvature r is selected at a situs between the rolling surface line and an extension of a line passing through the radially innermost terminal face, i.e., the crest of the flange. In this manner, a partial crowning is applied on the outer end face of the cylindrical roller at the portion thereof near its rolling surface.

Where any skewing of the roller occurs during rotation, the intersectional circular line C, on the convex guide face 7 of the flange 3, also, acts to provide a contact point c closer to the raceway surface of the outer race as shown in FIG. 5. This manner of relative contact gives rise to a shorter radius of rotation, lower relative sliding velocity and a strong wedge action brought about by a synergistic effect between the tapered convex surface of the guide surface of the flange and the crowning applied to the radially outer end portion of the cylindrical roller. These factors ensure excellent formation of a hydrodynamic lubricating oil film around the roller.

The axial length between the two opposite guide faces 7 of the flange 3 of the outer race 1 is selected in such a manner that the amount of axial movement $\Delta lr$ can be minimized. Accordingly, if any roller(s) becomes skewed during rotation, an excessive skew angle cannot be reached and any detrimental force due to skew moment is kept to a minimum.

Figure 6:
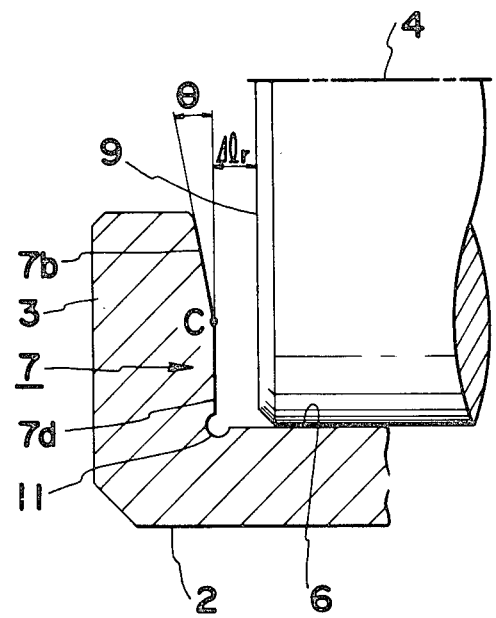
FIG. 6 is a partial, enlarged view showing another embodiment of the present invention.
Figure 7:
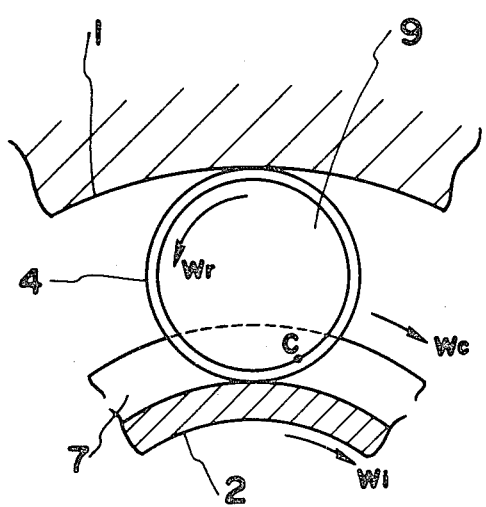
FIG. 7 is an end view of the embodiment.

FIG. 6 shows another example of this invention, in which a different type of guide face 7 of a flange 3 is arranged on an inner race 2.

The configuration of the guide face 7 is formed as a combined convex surface and is defined by a flat annular face 7d and a tapered face 7b. The face 7d starts from the radial outer end rim of an undercut 11 formed between the raceway 6 and the guide face 7. The face 7d extends perpendicular to the axis of the inner race. The annular face 7b diverges in a radially outward direction at an inclination angle $\theta$ with respect to said flat face 7d. The intersection between the faces defines a circular line C.

The inclination angle $\theta$ can be suitably selected within 5' to 120' depending upon the loading condition to be applied. The location of the intersectional line C is selected such that it is positioned at a distance from the radially outermost end, i.e., the crest of the flange, toward the radially inward direction, more than one-third of the radial length (height) of the guide surface 7 of the flange.

When a guide flange is arranged on an outer race, a similar intersection line is positioned at a place, on a radially outward portion of the flange at a similar distance from the crest of the guide flange.

Under this circumstance, the end face 9 of the cylindrical roller is formed as a flat plane perpendicular to the axis of the roller. Likewise, the roller may also be crowned, as shown in FIG. 4.

The axial length between the two opposite guide faces of the inner race 2 is selected so as to restrain the bearing against axial movement $\Delta lr$, as much as possible, in a similar way in the embodiments already mentioned. Thus, the point where the end end face 9 of the cylindrical roller contacts the guide face 7 of the flange, when any skewing of the roller takes place, lies on the intersectional circular line C on the convex guide face and comes to the point c on the end face of the roller more adjacent to the raceway. Accordingly, due to similar reasons, relative sliding velocity and the force exerted by the skew moment are reduced and results in better oil film formation.

Figure 8:
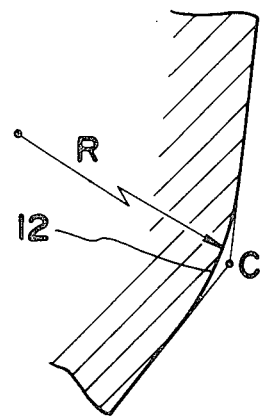
FIG. 8 is a sectional view showing the configuration of a rounded-off guide surface of a flange.

In the above-mentioned embodiments two tapered faces, or a tapered face and a flat vertical face of the guide surface of the outer race or the inner race, intersect at a certain angle. However, these two faces need not always intersect at a line. Rather, they can be connected, as shown in FIG. 8, by a curved surfaced 12 having a certain radius of curvature R which can be selected so as to smoothly connect the two surfaces, that is, such that the curved surface tangentially contacts the two tapered faces. In this instance too, the position at which the end face of the roller contacts the guide face of the flange comes close to the intersectional line C so that the same effect as mentioned before can be attained.

It is also possible in the embodiments of FIGS. 2 and 4 to provide an undercut between the raceway and the guide face of the flange and to form a first tapered face from the radial marginal end of the undercut.

In each of the above-mentioned embodiments, any applied crowning is a partial crowning only at the radially outer marginal part near the raceway side. However, a full crowning to have all the end face with a sphere can be practicable.

I claim:

1. A cylindrical roller bearing which comprises: (a) an outer race, (b) an inner race, (c) a pair of guide flanges each having a guide face and associated with one of the races, and (d) a plurality of cylindrical rollers rotatably arranged between raceways of said outer race and said inner race, and wherein the configuration of said guide face of said guide flange is a combined convex face comprising two tapered contiguous faces, a cross sectional profile of which, taken along the axis of rotation of the roller, includes two tapered straight lines, contiguous one after the other, both converging axially and outwardly from the axial ends of the respective raceway at different inclination angles, and further wherein the amount of axial movement of said rollers is restrained.

2. A cylindrical roller bearing as claimed in claim 1, wherein each end face of each cylindrical roller is a flat plane normal to the axis of rotation.

3. A cylindrical roller bearing as claimed in claim 1, wherein each end face of each cylindrical roller is crowned.

4. A cylindrical roller bearing as claimed in claim 1, wherein the two tapered straight lines, and defining the cross-sectional convex profile are smoothly and contiguously connected by a curved line.

* * * * *